(12) United States Patent
Shin

(10) Patent No.: US 9,381,525 B2
(45) Date of Patent: Jul. 5, 2016

(54) LOW PRESSURE FOGGING DEVICE

(71) Applicant: Hong Kun Shin, Miryang-si (KR)

(72) Inventor: Hong Kun Shin, Miryang-si (KR)

( * ) Notice: Subject to any disclaimer, the term of this patent is extended or adjusted under 35 U.S.C. 154(b) by 0 days.

(21) Appl. No.: 14/598,473

(22) Filed: Jan. 16, 2015

(65) Prior Publication Data

US 2015/0209805 A1    Jul. 30, 2015

(30) Foreign Application Priority Data

Jan. 29, 2014  (KR) .......................... 10-2014-0011756
Dec. 18, 2014  (KR) .......................... 10-2014-0183526

(51) Int. Cl.
*B05B 1/34*    (2006.01)
*B05B 1/02*    (2006.01)
*A01G 9/24*    (2006.01)

(52) U.S. Cl.
CPC ................. *B05B 1/02* (2013.01); *B05B 1/3436* (2013.01); *A01G 9/247* (2013.01)

(58) Field of Classification Search
None
See application file for complete search history.

(56) References Cited

U.S. PATENT DOCUMENTS

| 2,733,103 | A | * | 1/1956 | Laster | B05B 1/3436 239/486 |
| 4,967,964 | A | * | 11/1990 | Pamper | B05B 1/3405 239/337 |
| 5,934,569 | A | * | 8/1999 | Soule | B05B 1/3436 239/468 |
| 6,186,417 | B1 | * | 2/2001 | Ho | B05B 1/3436 239/491 |
| 7,198,201 | B2 | * | 4/2007 | Bowman | B05B 1/3436 216/100 |
| 2004/0135006 | A1 | * | 7/2004 | Zur | B05B 1/14 239/490 |

* cited by examiner

*Primary Examiner* — Len Tran
*Assistant Examiner* — Adam J Rogers
(74) *Attorney, Agent, or Firm* — Park & Associates IP Law, P.C.

(57) ABSTRACT

A low pressure fogging device includes a fogging device body having a hose coupling tube formed unitarily with the lower side thereof, a screw portion formed on the upper side thereof, and a fluid flow-inducing member seating plate formed on top of the screw portion; a fluid flow-inducing member having induction wings seated on top of the fluid flow-inducing member seating plate; a nozzle body having a fitting hole open downwardly therefrom to allow the fluid flow-inducing member seating plate and the fluid flow-inducing member to be fitted thereto; and a push-up nut having a pressuring ring formed at the center thereof to be locked onto a locking projection formed from an outer lower end periphery of the nozzle body and a screw groove formed at the inner periphery thereof to be fastened to a screw portion formed on the fogging device body.

6 Claims, 7 Drawing Sheets

LOW PRESSURE FOGGING DEVICE

REFERENCE TO RELATED APPLICATIONS

This application claims the priority benefit of Korean Patent Application No. 10-2014-0011756 filed on Jan. 29, 2014, and Korean Patent Application No. 10-2014-0183526 filed on Dec. 18, 2014, the entire contents of which are incorporated herein by reference.

FIELD OF THE INVENTION

The present invention relates to a low pressure fogging device that is applied to a green house or barn to spray fine water drops like fog, and more particularly, to a low pressure fogging device that is assemblable and disassemblable, without having any separate tool, maintains complete tightness through screw type mechanical combination, minimizes the decrement of pressure of a fluid, conducts easy cleaning, filters foreign matters in sequential steps when the fluid is passed through a fluid flow-inducing member from a fogging device body to minimize the occurrence of clogging on passages, allows the depths of the passages of the fluid flow-inducing member to be equal to or smaller than the diameter of a nozzle hole to prevent the nozzle hole from clogging, increases the number of spraying times without clogging on the nozzle hole, and maintains the fogging capability at a low pressure (in the range of 2 to 3 kg/cm$^2$).

BACKGROUND OF THE INVENTION

Generally, a fogging device, which produces fine water drops like fog, is located in a green house or barn in which a variety of vegetables, garden products, or farm animals are cultivated or raised to spray liquid chemicals or control humidity and temperature thereinto.

A plastic fogging device used generally includes: a fixing body having coupling holes to which posts are coupled formed on one side or both sides thereof or in every direction thereof, an insertion tube and a hose coupling tube to which a hose is fitted disposed on the upper and lower sides thereof, and locking projections formed on both sides of the insertion tube; a nozzle fixture having a locking protrusion formed on the lower end periphery thereof in such a manner as to be coupled to the locking projections of the fixing body and handles protruding from both sides of the upper portion thereof; a nozzle adapted to be inserted into a nozzle insertion hole having a locking projection penetrated into the nozzle fixture; and a nipple screw-coupled to the nozzle fixture and having a fixing portion formed on the upper side thereof to pressurize the nozzle and a passage adapted to supply water from the insertion hose to the nozzle.

The nozzle includes a body having a locking step from which a protruding round rim formed thereon, the protruding round rim being adapted to come into contact with the locking projection formed on the nozzle insertion hole and a nipple induction projection formed on the lower periphery of the body, a conical vortex space portion formed on the inner side of the body to supply water to a nozzle hole formed on the top end thereof, in the form of vortex, and one passage formed underneath the vortex space portion to guide the water to the vortex space portion from the outside of the body, in the form of vortex. Further, the insertion hose of the fixing body and the nipple are coupled separably to each other in their assembled state. According to the conventional plastic fogging device, when the nipple is disassembled and assembled to clean the nozzle, the nozzle is not rigidly pressurized upon the abrasion of the screw of the nipple, and even when the nozzle fixture and the nozzle are brought into close contact with each other, the locking projection formed on the nozzle insertion hole at the inner side of the nozzle fixture and the protruding round rim formed on the locking step on the body of the nozzle are point-contacted with each other, so that if a fine scar occurs on the protruding round rim, the functionality of the nozzle may be deteriorated.

So as to remove the above-mentioned problems, accordingly, there is proposed Korean Utility Model Registration No. (Y1) 20-0419612 (issued on Jun. 21, 2006 to the same inventor as the invention) disclosing a plastic fogging device wherein a nozzle fixture and a nozzle are surface-contacted with each other, and in the state where a nipple is coupled to the nozzle fixture, the lower end periphery of the nipple comes into contact with an insertion hose formed on the upper end periphery of a fixing body, so that the nozzle is fixed always under the same conditions. Further, the nozzle has a straight tube portion formed underneath the vortex space portion in such a manner as to have the same height as passages guiding water to the vortex space portion, and in this case, the passages are formed plurally, thus enhancing water supply and fogging efficiencies even under a low pressure.

In the above-mentioned prior art, however, the nipple is screw-coupled to the nozzle fixture in such a manner as to be embedded into the nozzle fixture, thus making it hard to disassemble and assemble the nipple. Besides, the passages formed on the nipple are large to cause foreign matters passed therethrough to clog the nozzle hole, thus making the functionality of the nozzle lost, and further, it is hard to clean the nozzle, thus making the fogging device itself thrown away.

SUMMARY OF THE INVENTION

Accordingly, the present invention has been made in view of the above-mentioned problems occurring in the prior art, and it is an object of the present invention to provide a low pressure fogging device that is capable of allowing a fluid flow-inducing member and a nozzle body laid on top of a fogging device body to be mechanically contacted with each other by means of a push-up nut screw-coupled to the fogging device body, without having any separate tool, thus maintaining complete tightness, filtering foreign matters in sequential steps when a fluid is passed through the fluid flow-inducing member from the fogging device body to minimize the occurrence of clogging on passages, allowing the depths of the passages formed on the outer peripheral surface of the fluid flow-inducing member to be equal to or smaller than the diameter of a nozzle hole to prevent the nozzle hole from clogging, increasing the number of spraying times without clogging on the nozzle hole, maintaining the fogging capability at a low pressure (in the range of 2 to 3 kg/cm$^2$), and conducting easy cleaning.

To accomplish the above-mentioned object, according to a first aspect of the present invention, there is provided a low pressure fogging device including: a fogging device body having a hose coupling tube formed unitarily with the lower side thereof around a boundary flat plate, a screw portion formed on the upper side thereof around the boundary flat plate, a fluid flow-inducing member seating plate formed on top of the screw portion and having a ring groove formed thereon in such a manner as to be coupled to an O-ring, and a water supply hole penetratedly formed from the hose coupling tube to the center of the fluid flow-inducing member seating plate; a fluid flow-inducing member having induction wings seated on top of the fluid flow-inducing member seating plate, an induction tube formed on the underside of the induction wings in such a manner as to be fitted to the water supply hole, a contacting protrusion formed upwardly from the induction wings in such a manner as to be inserted into a nozzle body and come into contact with vortex passages formed on the nozzle body, and passages adapted to induce and supply a fluid; the nozzle body having a fitting hole open downwardly therefrom in such a manner as to allow the fluid flow-inducing member seating plate of the fogging device body and the induction wings of the fluid flow-inducing member to be fitted thereto, arch-shaped facing coupling protrusions formed on top of the fitting hole and having a smaller diameter than the fitting hole, the vortex passages formed on the ceiling of the fitting hole, and a nozzle hole formed on the center of the ceiling of the fitting hole in such a manner as to be connected to the vortex passages; and a push-up nut having a pressuring ring formed at the center thereof in such a manner as to be locked onto a locking projection formed from an outer lower end periphery of the nozzle body and a screw groove formed at the inner periphery thereof in such a manner as to be fastened to the screw portion formed on the fogging device body.

According to the present invention, preferably, each passage of the fluid flow-inducing member includes: an incised passage open downwardly from the induction tube in an axis perpendicular direction; a horizontal passage depressedly formed on the underside of the induction wings coming into contact with the fluid flow-inducing member seating plate in such a manner as to be connected to the incised passage; and a vertical passage formed on the upper side of the induction wings from the end of the horizontal passage to supply the fluid to a space portion between the contacting protrusion and the fitting hole.

According to the present invention, preferably, a depth of the horizontal passage coming into contact with the fluid flow-inducing member seating plate or a depth of the vertical passage coming into the fitting hole of the nozzle body is equal to or smaller than the diameter of a nozzle hole formed on the nozzle body, so that foreign matters entering the low pressure fogging device from the outside are filtered through the fluid flow-inducing member before entering the nozzle hole of the nozzle body.

To accomplish the above-mentioned object, according to a second aspect of the present invention, there is provided a low pressure fogging device including: a fogging device body having a hose coupling tube formed unitarily with the lower side thereof around a boundary flat plate, a screw portion formed on the upper side thereof around the boundary flat plate, a fluid flow-inducing member seating plate formed on top of the screw portion and having a ring groove formed thereon in such a manner as to be coupled to an O-ring, and a water supply hole penetratedly formed from the hose coupling tube to the center of the fluid flow-inducing member seating plate; a fluid flow-inducing member having a body inserted into a nozzle body in such a manner as to come into close contact with vortex passages on the top surface thereof to form a cylindrical passage between the outer peripheral surface thereof and the inner peripheral wall of the nozzle body, a plurality of base protrusions formed radially on the lower end periphery of the body in such a manner as to be seated on the top of the fluid flow-inducing member seating plate to form a space portion between the fluid flow-inducing member seating plate and the base protrusions, and an induction tube formed at the center of the inner side of the base protrusions of the body in such a manner as to be fitted to the water supply hole; the nozzle body having a fitting hole open downwardly therefrom in such a manner as to allow the fluid flow-inducing member seating plate of the fogging device body to be fitted thereto, arch-shaped facing coupling protrusions formed on top of the fitting hole and having a smaller diameter than the fitting hole, the vortex passages formed on the ceiling of the fitting hole, and a nozzle hole formed on the center of the ceiling of the fitting hole in such a manner as to be connected to the vortex passages; and a push-up nut having a pressuring ring formed at the center thereof in such a manner as to be locked onto a locking projection formed from an outer lower end periphery of the nozzle body and a screw groove formed at the inner periphery thereof in such a manner as to be fastened to the screw portion formed on the fogging device body.

According to the present invention, preferably, the space portion formed between the fluid flow-inducing member seating plate and the base protrusions is smaller than incised passages formed on the induction tube, and the cylindrical passage formed between the outer peripheral surface thereof and the inner peripheral wall of the nozzle body is smaller than the space portion.

According to the present invention, preferably, the body of the fluid flow-inducing member has a fitting portion formed on the top portion thereof in such a manner as to be reduced in diameter, the fitting portion being fitted to the coupling protrusions formed on the nozzle body to allow the top surface thereof to be face-contacted with the vortex passages formed on the nozzle body.

According to the present invention, preferably, the fluid flow-inducing member has a foreign matter-storing space formed in a shape of a circle between the base protrusions and the induction tube and a drainage hole formed on the lower end of the body in such a manner as to communicate with the foreign matter-storing space.

According to the present invention, preferably, the drainage hole communicating with the foreign matter-storing space is smaller than the incised passages formed on the induction tube and larger than the cylindrical passage formed between the outer peripheral surface of the fluid flow-inducing member and the inner peripheral wall of the nozzle body.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE INVENTION

Hereinafter, an explanation on a low pressure fogging device according to the present invention will be in detail given with reference to the attached drawing.

Figure 1:
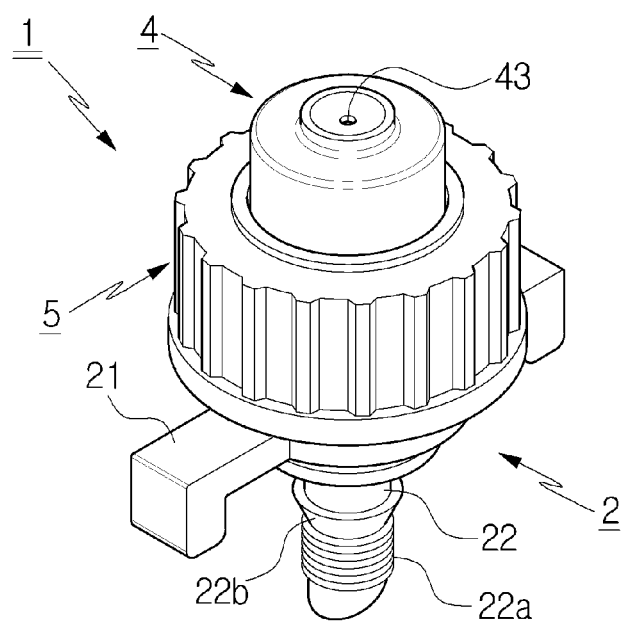
FIG. 1 is a perspective view showing a low pressure fogging device according to a first embodiment of the present invention.
Figure 2:
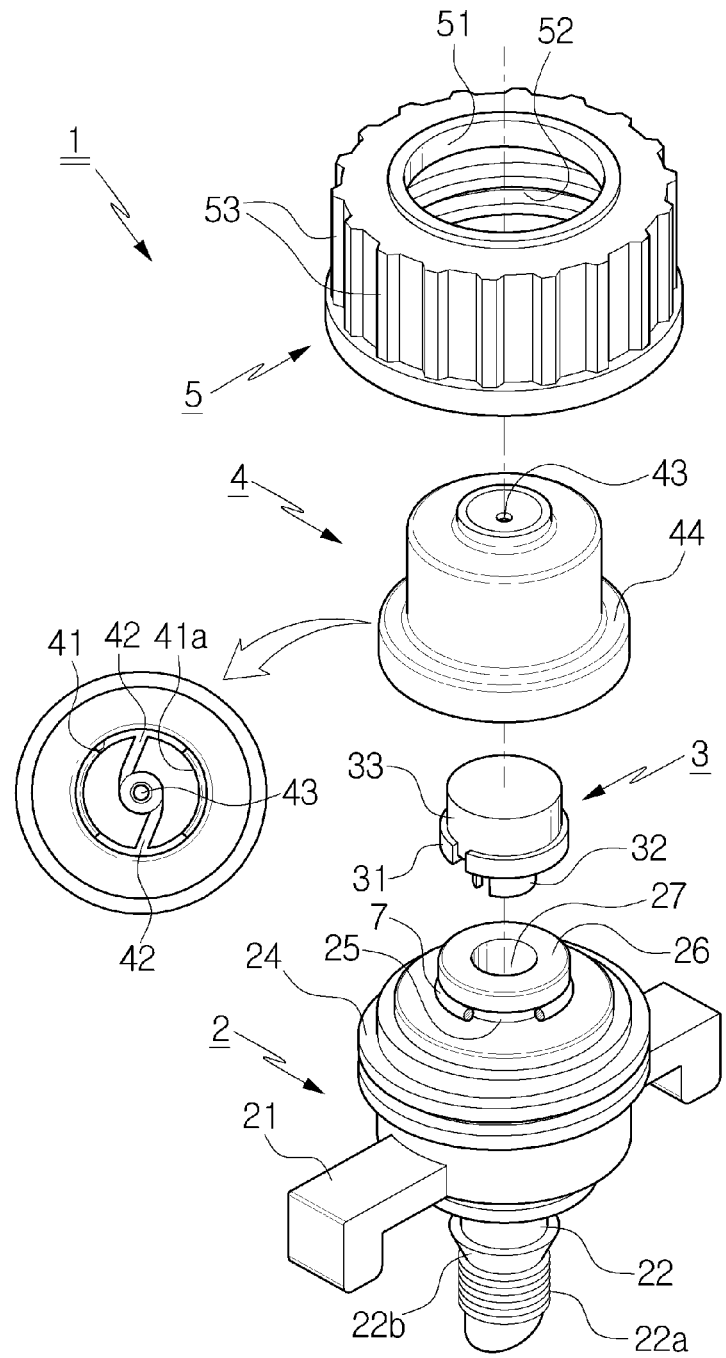
FIG. 2 is an exploded perspective view showing the low pressure fogging device according to the first embodiment of the present invention.
Figure 3:
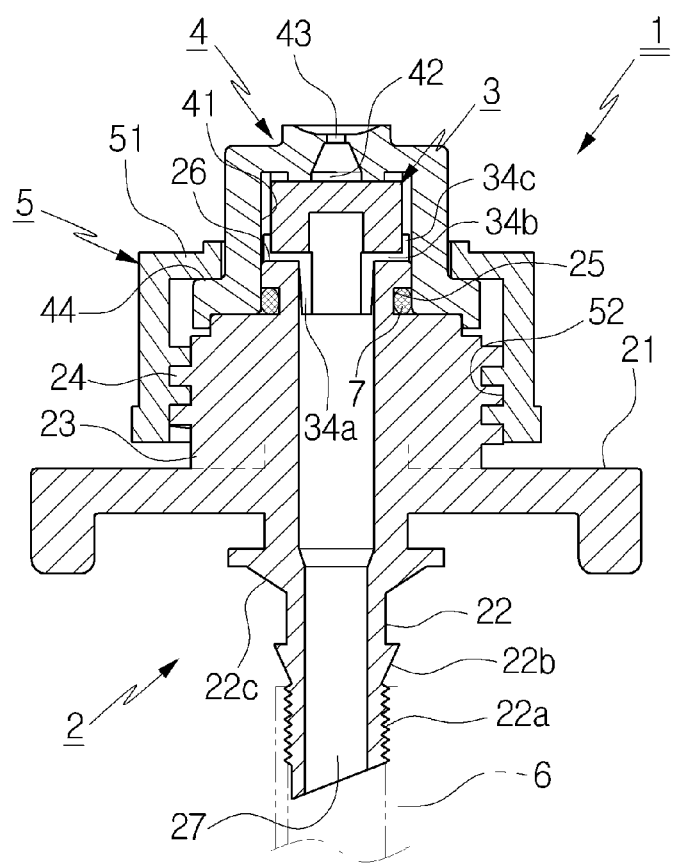
FIG. 3 is a sectional view showing the assembled state of the low pressure fogging device according to the first embodiment of the present invention.
Figure 4:
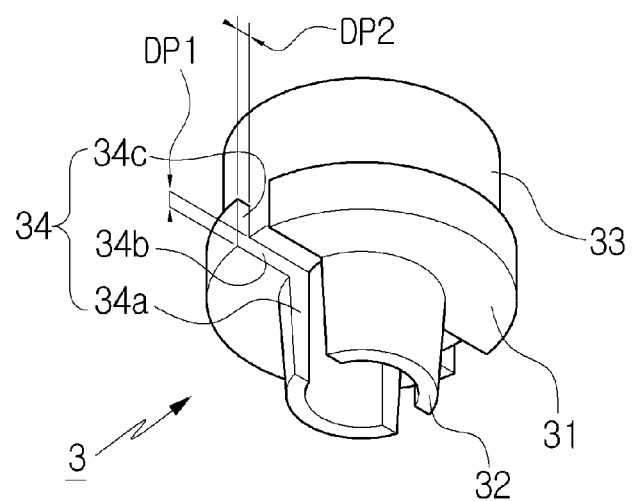
FIG. 4 is a perspective view showing a fluid flow-inducing member in the low pressure fogging device according to the first embodiment of the present invention.
Figure 5:
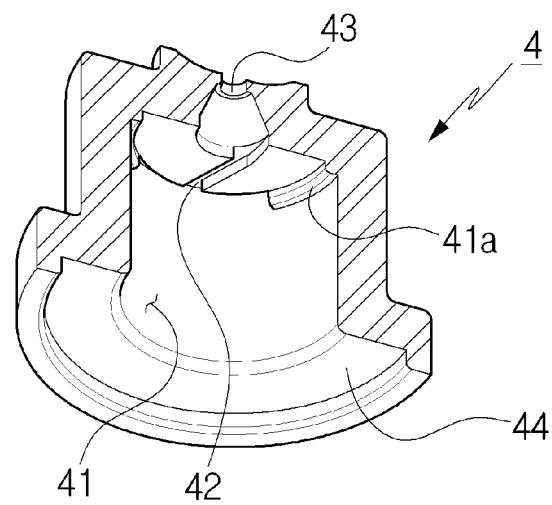
FIG. 5 is a bottom perspective view showing the section of a nozzle body in the low pressure fogging device according to the first embodiment of the present invention.

FIG. 1 is a perspective view showing a low pressure fogging device according to a first embodiment of the present invention, FIG. 2 is an exploded perspective view showing the low pressure fogging device according to the first embodiment of the present invention, FIG. 3 is a sectional view showing the assembled state of the low pressure fogging device according to the first embodiment of the present invention, FIG. 4 is a perspective view showing a fluid flow-inducing member in the low pressure fogging device according to the first embodiment of the present invention, and FIG. 5 is a bottom perspective view showing the section of a nozzle body in the low pressure fogging device according to the first embodiment of the present invention.

As shown, a low pressure fogging device 1 according to a first embodiment of the present invention largely includes a fogging device body 2, a fluid flow-inducing member 3 mounted on top of the fogging device body 2, a nozzle body 4 adapted to close the upper portion of the fluid flow-inducing member 3, and a push-up nut 5 screw-coupled to the fogging device body 2 to pressurize the nozzle body 4 toward the fluid flow-inducing member 3.

The fogging device body 2 has a hose coupling tube 22 formed unitarily with the lower side thereof around a boundary flat plate 21. The hose coupling tube 22 includes a screw tube 22a formed on the lower periphery thereof in such a manner as to be screw-coupled to a hose 6 and an inversely tapered barb 22b formed on the upper periphery thereof in such a manner as to be increased in diameter as it goes toward the upper side thereof, and accordingly, the hose coupling tube 22 is assembled to the hose 6 having various diameters. That is, if the hose 6 has a diameter corresponding to the screw tube 22a, the hose 6 can be coupled to the screw tube 22a by means of fastening like nut fastening, and if the hose 6 has a larger diameter than the screw tube 22a, the top end periphery of the hose 6 located between the boundary flat plate 21 and the barb 22b in the state where the hose 6 is passed through the barb 22b is rigidly fixed by means of a band. Further, the fogging device body 2 has a rib 22c formed on a boundary portion between the boundary flat plate 21 and the hose coupling tube 22 to prevent the boundary portion from being bent and broken due to external impacts.

Further, the fogging device body 2 has a screw portion 24 supported against a support rib 23 formed on the upper side thereof around the boundary flat plate 21 and a fluid flow-inducing member seating plate 26 formed on top of the screw portion 24, and the fluid flow-inducing member seating plate 26 has a ring groove 25 formed thereon in such a manner as to be coupled to an O-ring 7. The fogging device body 2 further has a water supply hole 27 penetratedly formed from the hose coupling tube 22 to the center of the fluid flow-inducing member seating plate 26 to supply a fluid therethrough.

The fluid flow-inducing member 3 has induction wings 31 seated on top of the fluid flow-inducing member seating plate 26 formed on the fogging device body 2, an induction tube 32 formed on the underside of the induction wings 31 in such a manner as to be fitted to the water supply hole 27, a contacting protrusion 33 formed upwardly from the induction wings 31 in such a manner as to be inserted into the nozzle body 4 and come into contact with vortex passages 42, and passages 34 adapted to induce and supply the fluid.

Each passage 34 includes an incised passage 34a open downwardly from the induction tube 32 in an axis perpendicular direction, a horizontal passage 34b depressedly formed on the underside of the induction wings 31 coming into contact with the fluid flow-inducing member seating plate 26 in such a manner as to be connected to the incised passage 34a, and a vertical passage 34c formed on the upper side of the induction wings 31 from the end of the horizontal passage 34b to supply the fluid to a space portion between the contacting protrusion 33 and a fitting hole 41.

In each passage 34 formed on the fluid flow-inducing member 3, a depth DP1 of the horizontal passage 34b coming into contact with the fluid flow-inducing member seating plate 26 or a depth DP2 of the vertical passage 34c coming into the fitting hole 41 of the nozzle body 4 is equal to or smaller than the diameter of a nozzle hole 43 formed on the nozzle body 4, so that foreign matters entering the low pressure fogging device 1 from the outside can be filtered through the fluid flow-inducing member 3 before entering the nozzle hole 43 of the nozzle body 4.

If the depths of the horizontal passage 34b and the vertical passage 34c are low, as mentioned above, a quantity of fluid being conveyed becomes reduced, and in this case, the quantity of fluid can be adjusted by enlarging a width P1 of the horizontal passage 34b and a width P2 of the vertical passage 34c.

The nozzle body 4 has the fitting hole 41 open downwardly therefrom in such a manner as to allow the fluid flow-inducing member seating plate 26 of the fogging device body 2 and the induction wings 31 of the fluid flow-inducing member 3 to be fitted thereto and arch-shaped facing coupling protrusions 41a formed on top of the fitting hole 41 and having a smaller diameter than the fitting hole 41. Further, the nozzle body 4 has the vortex passages 42 formed symmetrically on the ceiling of the fitting hole 41 and the nozzle hole 43 formed on the center of the ceiling of the fitting hole 41 in such a manner as to be connected to the vortex passages 42.

The vortex passages 42 are symmetrical to each other and have an overlaid portion wherein the round portions of shapes of '6' and '9' are laid on each other. Under the above-mentioned configuration, in the state where the contacting protrusion 33 of the fluid flow-inducing member 3 comes into contact with the top periphery of the fitting hole 41, the fluid supplied through the passages 34 formed on the fluid flow-inducing member 3 is introduced bidirectionally through the vortex passages 42 provided in a sealed state between the contacting protrusion 33 and the fitting hole 41 and collide against each other, thus being broken and sprayed through the small nozzle hole 43.

The push-up nut 5 has a pressuring ring 51 formed at the center thereof in such a manner as to be locked onto a locking projection 44 formed from an outer lower end periphery of the nozzle body 4 and a screw groove 52 formed at the inner periphery thereof in such a manner as to be fastened to the screw portion 24 formed on the fogging device body 2. Further, the push-up nut 5 has non-slip protrusions 53 formed on the outer periphery thereof to prevent slipping from occurring when the push-up nut 5 is fastened or unfastened, thus easily fastening or unfastening the push-up nut 5 without having any separate tool.

If the low pressure fogging device 1 having the above-mentioned configuration is used, the hose 6 is connected to the hose coupling tube 22 of the fogging device body 2 in the assembled state of the low pressure fogging device 1, and next, the fluid is supplied, so that the fluid is supplied to the nozzle body 4 through the fluid flow-inducing member 3.

At this time, the fluid is supplied to the vortex passages 42 through the passages 34 formed on the fluid flow-inducing member 3, and as mentioned above, the passages 34 formed on the fluid flow-inducing member 3 is configured wherein the horizontal passages 34*b* and the vertical passages 34*c* are exposed to the outside and the depths DP1 and DP2 of the horizontal passages 34*b* and the vertical passages 34*c* are equal to or smaller than the diameter of the nozzle hole 43, thus serving as a filter capable of filtering the foreign matters supplied from the outside to prevent the nozzle hole 43 from clogging. On the other hand, even if clogging occurs to require cleaning, the push-up nut 5 is unfastened to separate the nozzle body 4 and the fluid flow-inducing member 3 from each other, and next, the horizontal passages 34*b* and the vertical passages 34*c* formed exposed to the outside on the fluid flow-inducing member 3 are simply cleaned, thus extending a life span of the fogging device and maintaining the fogging capability at a low pressure (in the range of 2 to 3 kg/cm$^2$).

Figure 6:
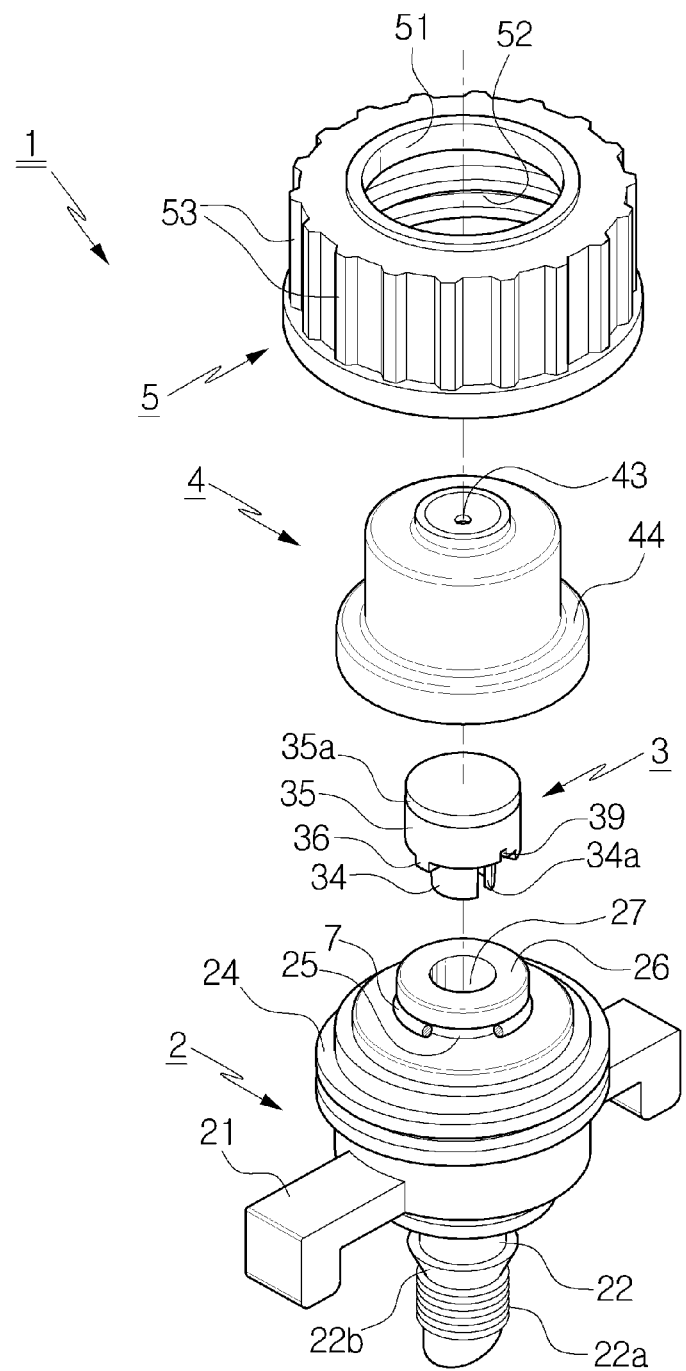
FIG. 6 is an exploded perspective view showing a low pressure fogging device according to a second embodiment of the present invention.
Figure 7:
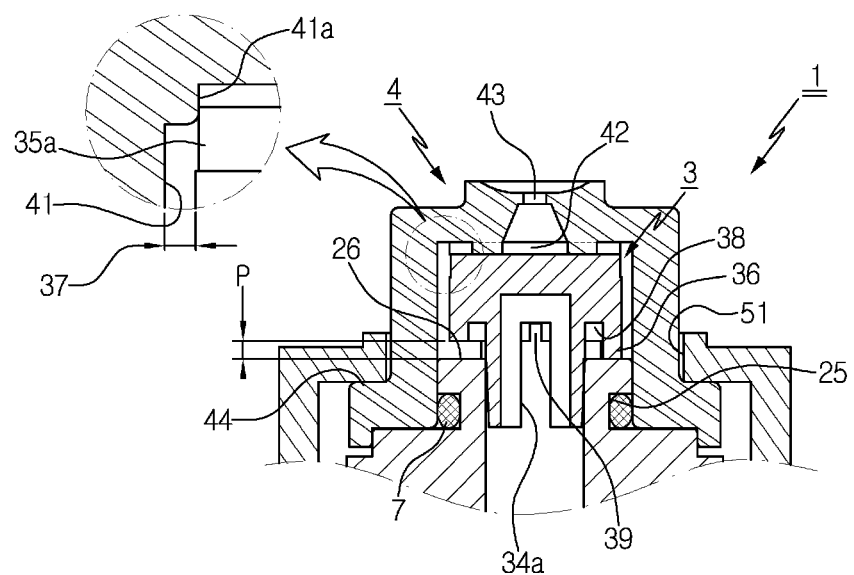
FIG. 7 is an enlarged sectional view showing the assembled state of a fluid flow-inducing member and a nozzle body in the low pressure fogging device according to the second embodiment of the present invention.
Figure 8:
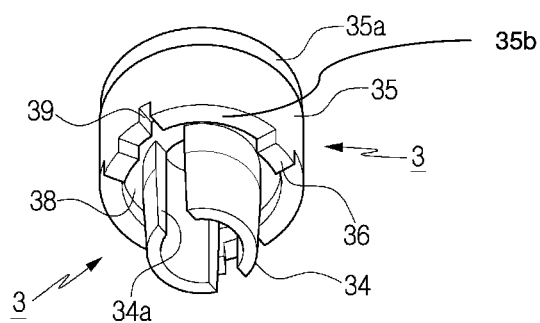
FIG. 8 is a bottom perspective view showing the fluid flow-inducing member in the low pressure fogging device according to the second embodiment of the present invention.
Figure 9:
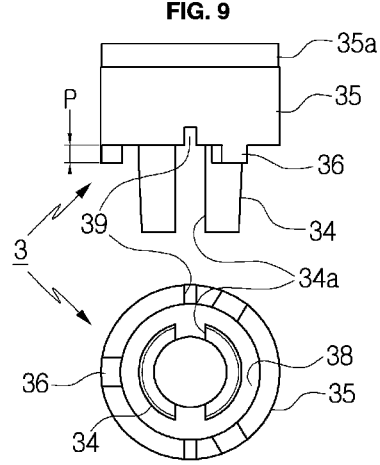
FIG. 9 is a front and bottom perspective view showing the fluid flow-inducing member in the low pressure fogging device according to the second embodiment of the present invention.

FIG. 6 is an exploded perspective view showing a low pressure fogging device according to a second embodiment of the present invention, FIG. 7 is an enlarged sectional view showing the assembled state of a fluid flow-inducing member and a nozzle body in the low pressure fogging device according to the second embodiment of the present invention, FIG. 8 is a bottom perspective view showing the fluid flow-inducing member in the low pressure fogging device according to the second embodiment of the present invention, and FIG. 9 is a front and bottom perspective view showing the fluid flow-inducing member in the low pressure fogging device according to the second embodiment of the present invention.

A low pressure fogging device 1 according to a second embodiment of the present invention has the same configuration as the low pressure fogging device according to the first embodiment of the present invention, except that the fluid flow-inducing member 3 is improved to allow the foreign matters contained in the fluid supplied through the water supply hole 27 of the fogging device body 2 to be filtered through sequential steps in accordance with their sizes, thus preventing the foreign matters from being moved to the nozzle hole 43 and provided with a foreign matter-storing space 38 adapted to keep a given quantity of filtered foreign matters therein to delay the clogging of the nozzle hole 43 to a maximum extent, thus maintaining the performance of the low pressure fogging device 1 and making it possible to use the low pressure fogging device 1 for a long period of time, without cleaning.

According to the second embodiment of the present invention, the fluid flow-inducing member 3 has a body 35 inserted into the nozzle body 4 in such a manner as to come into close contact with the vortex passages 42 and a plurality of base protrusions 36 formed radially on the lower end periphery (or rim) 35*b* of the body 35 in such a manner as to be seated on the top of the fluid flow-inducing member seating plate 26, thus forming a space portion P between the fluid flow-inducing member seating plate 26 and the lower end periphery 35*b* to conduct fluid movement. At this time, the body 35 has a fitting portion 35*a* formed on the top portion thereof in such a manner as to be reduced in diameter, and the fitting portion 35*a* is fitted to the coupling protrusions 41*a* formed on the nozzle body 4 to allow the top surface thereof to be face-contacted with the vortex passages 42 formed on the nozzle body 4. Further, a cylindrical passage 37 is formed between the outer peripheral surface of the fluid flow-inducing member 3 and the inner peripheral wall of the nozzle body 4, and three base protrusions 36 are formed to stably support the body 35 against the fluid flow-inducing member seating plate 26.

The fluid flow-inducing member 3 further has an induction tube 34 formed at the center of the inner side of the base protrusions 36 of the body 35 in such a manner as to be fitted to the water supply hole 27 and incised passages 34*a* formed on the induction tube 34 to induce and supply the fluid supplied from the water supply hole 27 to the space portion P formed between the fluid flow-inducing member seating plate 26 and the lower end periphery 35*b*.

On the other hand, the foreign matter-storing space 38 is formed in a shape of a circle between the lower end periphery 35*b* and the induction tube 34, and a drainage hole 39 is formed at a given position on the lower end periphery of the body 35 in such a manner as to communicate with the foreign matter-storing space 38. The foreign matter-storing space 38 and the drainage hole 39 store the foreign matters having the sizes passed through the incised passages 34*a* formed on the induction tube 32 and not passed through the space portion P between the fluid flow-inducing member seating plate 26 and the lower end periphery 35*b* in the collected state, thus maintaining the fluid supply capability of the low pressure fogging device 1 for a long period of time. Particularly, if water supply stops in the state where the low pressure fogging device 1 is installed toward the ground, water is collected in the foreign matter-storing space 38, and at this time, if the water still exists therein, organic matters contained in the water are hardened to generate a remainder. The formation of the remainder causes the nozzle hole 43 to clog when water is supplied again. According to second embodiment of the present invention, therefore, the formation of the drainage hole 39 communicating with the foreign matter-storing space 38 allows the water in the foreign matter-storing space 38 to be fully discharged, thus preventing the formation of the remainder.

According to second embodiment of the present invention, on the other hand, the low pressure fogging device 1 has the incised passages 34*a* each having the size of 1.2 mm formed on the induction tube 34, the space portion P having the size of 0.7 mm formed between the fluid flow-inducing member seating plate 26 and the lower end periphery 35*b*, the cylindrical passage 37 having the size of 0.5 mm or less formed between the outer peripheral surface of the fluid flow-inducing member 3 and the inner peripheral wall of the nozzle body 4, and the drainage hole 39 having the size in the range of 0.5 to 0.7 mm communicating with the foreign matter-storing space 38.

The incised passages 34*a*, the space portion P and the cylindrical passage 37 serve to three times filter the foreign matters contained in the water supplied through the water supply hole 27 of the fogging device body 2 in accordance with the sizes of the foreign matters, thus minimizing the occurrence of clogging on the nozzle hole 43 formed on the nozzle body 4.

According to second embodiment of the present invention, further, the fitting portion 35*a* formed on the upper portion of the body 35 of the fluid flow-inducing member 3 is fitted to the coupling protrusions 41*a* of the nozzle body 4, and the induction tube 34 formed on the lower portion of the fluid flow-inducing member 3 is fitted to the water supply hole 27, thus firmly coupling the fluid flow-inducing member 3, without any movement and constantly maintaining the space portion P formed between the fluid flow-inducing member seating plate 26 and the lower end periphery 35b. Further, the roundness of the cylindrical passage 37 formed between the outer peripheral surface of the fluid flow-inducing member 3 and the inner peripheral wall of the nozzle body 4 is provided to prevent the foreign matters clogging the nozzle hole 43 from being passed through the cylindrical passage 37 due to the excessive increment of more than 0.5 mm on one side cylindrical passage 37 through the eccentricity of the cylindrical passage 37.

Figure 10:
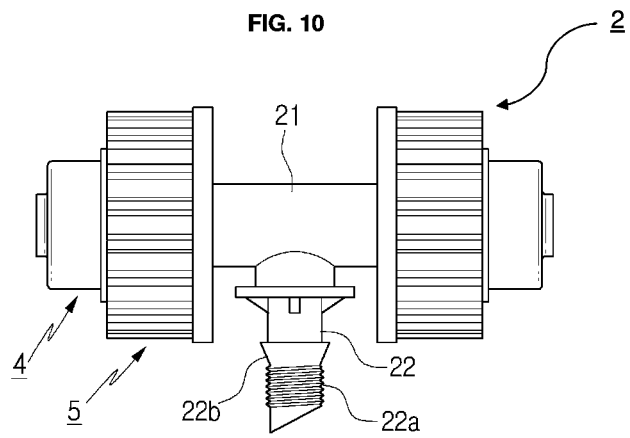
FIG. 10 is a front view showing a set of low pressure fogging devices according to the present invention, which are arranged symmetrically on left and right sides.

FIG. 10 is a front view showing a set of low pressure fogging devices according to the present invention, which are arranged symmetrically on left and right sides.

As shown, a two-entry type low pressure fogging device is provided wherein the fluid flow-inducing members 3, the nozzle bodies 4 closing the upper portions of the fluid flow-inducing members 3, and the push-up nuts 5 screw-coupled to the fogging device body 2 to pressurize the nozzle bodies 4 toward the fluid flow-inducing members 3 are mounted symmetrically on the left and right sides of the fogging device body 2, and if necessary, a four-entry type low pressure fogging device may be mounted on the fogging device body 2 in every direction.

As described above, the low pressure fogging device according to the preferred embodiments of the present invention can couple the push-up nut to the screw portion formed on the fogging device body, thus maintaining complete tightness through the mechanical combination.

Further, the parts of the low pressure fogging device can be assembled and disassembled in a simple manner.

Furthermore, the fluid flow-inducing member and the nozzle body are provided always at a tight state, thus maintaining the fogging capability for a long period of time.

Additionally, the passages of the fluid flow-inducing member are exposed to the outside, thus conducting easy cleaning.

In addition, the depths of the passages are equal to or smaller than the diameter of the nozzle hole, thus preventing the nozzle hole from clogging.

Further, the foreign matters can be filtered sequentially through the incised passages formed on the induction tube, the space portion formed between the fluid flow-inducing member seating plate and the base protrusions, and the cylindrical passage formed between the outer peripheral surface of the fluid flow-inducing member and the inner peripheral wall of the nozzle body, thus minimizing the occurrence of clogging of the nozzle hole.

Moreover, the fitting portion formed on the upper portion of the body of the fluid flow-inducing member is fitted to the coupling protrusions of the nozzle body, and the induction tube formed on the lower portion of the fluid flow-inducing member is fitted to the water supply hole, thus firmly coupling the fluid flow-inducing member, without any movement, constantly maintaining the space portion formed between the fluid flow-inducing member seating plate and the base protrusions, and providing the roundness of the cylindrical passage formed between the outer peripheral surface of the fluid flow-inducing member and the inner peripheral wall of the nozzle body.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A low pressure fogging device comprising:
   a fogging device body (2) having a hose coupling tube (22) formed unitarily with the lower side thereof, a screw portion (24) formed on the upper side thereof, a fluid flow-inducing member seating plate (26) formed on an upper side of the screw portion (24), and a water supply hole (27) formed through the fogging device body (2) from the hose coupling tube (22) to the center of the fluid flow-inducing member seating plate (26);
   a fluid flow-inducing member (3) having a body (35) inserted into a nozzle body (4) in such a manner as to come into close contact with vortex passages (42) on the top surface thereof to form a cylindrical passage (37) between the outer peripheral surface thereof and the inner peripheral wall of the nozzle body (4), a plurality of base protrusions (36) formed radially on the lower end periphery (35b) of the body (35) in such a manner as to be seated on the top of the fluid flow-inducing member seating plate (26) to form a space portion (P) between the fluid flow-inducing member seating plate (26) and the lower end periphery (35b), and an induction tube (34) formed at the center of the inner side of the base protrusions (36) of the body (35) in such a manner as to be fitted to the water supply hole (27);
   the nozzle body (4) having a fitting hole (41) open downwardly therefrom in such a manner as to allow the fluid flow-inducing member seating plate (26) of the fogging device body (2) to be fitted thereto, arc-shaped facing coupling protrusions (41a) formed on an upper inner circumference of the fitting hole (41), the vortex passages (42) formed on the ceiling of the fitting hole (41), and a nozzle hole (43) formed on the center of the ceiling of the fitting hole (41) in such a manner as to be connected to the vortex passages (42); and
   a push-up nut (5) having a pressuring ring (51) configured to be locked onto a locking projection (44) of the nozzle body (4) and a screw groove (52) formed at the inner periphery thereof in such a manner as to be fastened to the screw portion (24) formed on the fogging device body (2),
   wherein the fluid flow-inducing member (3) has a foreign matter-storing space (38) formed in a shape of a circle between the lower end periphery (35b) and the induction tube (34), and a drainage hole (39) formed on the lower end periphery (35b) in such a manner as to communicate with the foreign matter-storing space (38).

2. The low pressure fogging device according to claim 1, wherein the space portion (P) formed between the fluid flow-inducing member seating plate (26) and the lower end periphery (35b) is smaller than incised passages (34a) formed on the induction tube (34), and the cylindrical passage (37) formed between the outer peripheral surface thereof and the inner peripheral wall of the nozzle body (4) is smaller than the space portion (P).

3. The low pressure fogging device according to claim 1, wherein the body (35) of the fluid flow-inducing member (3) has a fitting portion (35a) formed on the top portion thereof in such a manner as to be reduced in diameter, the fitting portion (35a) being fitted to the coupling protrusions (41a) formed on the nozzle body (4) to allow the top surface thereof to be face-contacted with the vortex passages (42) formed on the nozzle body (4).

4. The low pressure fogging device according to claim 1, wherein the drainage hole (39) communicating with the foreign matter-storing space (38) is smaller than the incised passages (34a) formed on the induction tube (34) and larger than the cylindrical passage (37) formed between the outer peripheral surface of the fluid flow-inducing member (3) and the inner peripheral wall of the nozzle body (4).

5. The low pressure fogging device according to claim 1, wherein the fogging device body (2) further includes a boundary flat plate (21) between the screw portion (24) and the hose coupling tube (22).

6. The low pressure fogging device according to claim 1, wherein the fogging device body (2) further includes an O-ring (7) coupled to a ring groove (25) formed below the fluid flow-inducing member seating plate (26).

* * * * *